(12) United States Patent
Ujiie et al.

(10) Patent No.: US 11,204,207 B2
(45) Date of Patent: Dec. 21, 2021

(54) VAPOR CONDENSATION METHOD

(71) Applicant: KURITA WATER INDUSTRIES LTD., Tokyo (JP)

(72) Inventors: Shogo Ujiie, Tokyo (JP); Junichi Takahashi, Singapore (SG); Eishi Shimmura, Singapore (SG)

(73) Assignee: KURITA WATER INDUSTRIES LTD., Tokyo (JP)

(*) Notice: Subject to any disclaimer, the term of this patent is extended or adjusted under 35 U.S.C. 154(b) by 0 days.

(21) Appl. No.: 16/640,607

(22) PCT Filed: Nov. 21, 2018

(86) PCT No.: PCT/JP2018/042947
§ 371 (c)(1),
(2) Date: Feb. 20, 2020

(87) PCT Pub. No.: WO2019/176176
PCT Pub. Date: Sep. 19, 2019

(65) Prior Publication Data
US 2020/0173739 A1 Jun. 4, 2020

(30) Foreign Application Priority Data
Mar. 14, 2018 (JP) .............................. JP2018-046833

(51) Int. Cl.
*B01D 5/00* (2006.01)
*F28F 19/00* (2006.01)
(Continued)

(52) U.S. Cl.
CPC ............ *F28F 19/00* (2013.01); *B01D 5/0003* (2013.01); *B01D 5/009* (2013.01); *F28F 21/08* (2013.01);
(Continued)

(58) Field of Classification Search
CPC ....... B01D 5/0003; B01D 5/009; F28F 19/00; F28F 21/08; F28B 1/02
See application file for complete search history.

(56) References Cited

U.S. PATENT DOCUMENTS 2,469,729 A * 5/1949 Hunter ..................... F28F 13/04
165/133
2,771,417 A * 11/1956 Ryznar .................. C23F 11/145
422/16
(Continued)

FOREIGN PATENT DOCUMENTS

| CN | 1063548 A | 8/1992 |
| CN | 101786060 A | 7/2010 |

(Continued)

OTHER PUBLICATIONS

China Patent Office, "Office Action for Chinese Patent Application No. 201880053228.3," dated Dec. 24, 2020.
(Continued)

*Primary Examiner* — Jonathan Miller
(74) *Attorney, Agent, or Firm* — Manabu Kanesaka

(57) ABSTRACT

A method to condense and liquefy vapor by introducing the vapor into a heat exchanger and bringing same into contact with a cooling body in the heat exchanger, wherein a droplet condensation promoting agent is directly added to the vapor introduced into the heat exchanger or to the heat exchanger. A droplet condensation promoting effect due to the droplet condensation promoting agent can be sufficiently manifested and condensation efficiency by droplet condensation can be improved by way of directly adding the droplet condensation promoting agent such as a film forming amine or the like to the vapor introduced into the heat exchanger or to the heat exchanger.

7 Claims, 2 Drawing Sheets

(51) Int. Cl.
*F28F 21/08* (2006.01)
*F28B 1/02* (2006.01)
*F28D 21/00* (2006.01)

(52) U.S. Cl.
CPC ........ *F28B 1/02* (2013.01); *F28D 2021/0063* (2013.01)

(56) References Cited

U.S. PATENT DOCUMENTS

| | | | | |
|---|---|---|---|---|
| 3,466,189 A * | 9/1969 | Erb | .......................... | F28F 13/04 428/626 |
| 3,547,185 A * | 12/1970 | Eissenberg | .............. | F28F 13/04 165/110 |
| 3,878,885 A * | 4/1975 | Deronzier | ............ | B01D 5/0003 165/133 |
| 4,601,933 A * | 7/1986 | Nakamura | ................ | C09K 5/04 138/145 |
| 4,801,394 A * | 1/1989 | Nakamura | ................ | C09K 5/04 252/71 |
| 5,026,523 A * | 6/1991 | Taya | ...................... | C23F 11/141 252/392 |
| 5,302,321 A * | 4/1994 | Akama | ................. | F22D 11/006 252/396 |
| 6,723,257 B2 | 4/2004 | Libutti et al. | | |
| 8,580,351 B2 | 11/2013 | Haje et al. | | |
| 2009/0266519 A1 | 10/2009 | Marinho et al. | | |

FOREIGN PATENT DOCUMENTS

| | | |
|---|---|---|
| CN | 203216302 U | 9/2013 |
| CN | 206818050 U | 12/2017 |
| DE | 707155 C | 6/1941 |
| JP | S57-192787 A | 11/1982 |
| JP | 2006-322627 A | 11/2006 |
| JP | 2011-80725 A | 4/2011 |
| JP | 5332971 B2 | 11/2013 |
| WO | 03/038007 A1 | 5/2003 |
| WO | 2012/101844 A1 | 8/2012 |
| WO | 2014/104262 A1 | 7/2014 |
| WO | 2014/178263 A1 | 11/2014 |

OTHER PUBLICATIONS

戴干策 (Dai Gance), "化学工程基础 - 流体流动，传热及传质 —(Fundamentals of Chemical Engineering—Fluid Flow, Heat Transfer and Mass Transfer-)," May 31, 1991, p. 275-276, 中国石化出版社 (China Petrochemical Press).

PCT/ISA/210, "International Search Report for International Application No. PCT/JP2018/042947," dated Feb. 5, 2019.

Tanasawa, I., "Dropwise Condensation—The Way to Practical Applications," Seisan-Kenkyu, Jun. 1978, p. 209-220, vol. 30, No. 6, Institute of Industrial Science, University of Tokyo, Japan.

China Patent Office, "Office Action for Chinese Patent Application No. 201880053228.3," dated Jul. 29, 2021.

"Physical Chemistry," Son Sego, Dec. 31, 2008, pp. 436-437, Xiamen University Press.

"Food Chemistry," Yang Yu Hong, Aug. 31, 2012, p. 151, China Quality Detection Edition.

Europe Patent Office, "Search Report for European Patent Application No. 18909457.6" dated Nov. 5, 2021.

* cited by examiner

Example 2

Comparative Example 2

VAPOR CONDENSATION METHOD

TECHNICAL FIELD

The present invention relates to a method for liquefying and condensing steam by introducing the steam to a heat exchanger and contacting the steam with a cooling body in the heat exchanger.

BACKGROUND ART

Methods for liquefying and condensing steam by contacting the steam with a solid wall whose temperature is lower than in the saturation state of the steam include methods for filmwise condensation in which a condensed liquid forms a continuous liquid film on the wall surface, and methods for dropwise condensation in which a condensed liquid becomes a large number of liquid drops without wetting the wall surface. Since the dropwise condensation exhibits a several to several tens times higher heat transfer coefficient than the filmwise condensation, methods for dropwise condensation of steam have been variously studied (for example, Non Patent Literature 1).

By enhancement of the condensation efficiency by materializing the dropwise condensation, the improvement of the process efficiency and the reduction of the cooling surface area of heat exchangers can be achieved, and the cutback of the initial cost due to the downsizing of facilities, the cutback of the amount of steam due to the improvement of the efficiency of existing facilities and the enhancement of the productivity can be expected.

In particular, in power-generating plants, when the heat transfer efficiency of steam condensers is enhanced, the improvement of the degree of vacuum can be expected, and the power-generating efficiency can also be expected. This, though depending on the designs and specifications of turbines and steam condensers, has room for improvement related to water temperature fluctuations, dirt and the like in many cases, and leads to great energy saving.

A film-forming amine used as a corrosion inhibitor of steam systems is absorbed on a metal surface in the steam systems, ionically bonds with each other and firmly adheres to the metal surface through a hydrophobic bond to thereby form a protective film layer (anticorrosive film) and prevent contacting of the metal with water. Hence, it is conceivable that application of the film-forming amine enables the dropwise condensation to be materialized.

A film-forming amine, since being used as a corrosion inhibitor for boiler water systems and the like, is added to feed-water for a boiler so that the anticorrosive action acts on the entire of the system interiors (for example, Patent Literature 1).

In conventional methods, even if a film-forming amine is added, dropwise condensation cannot sufficiently be materialized; so, further improvement of the condensation efficiency of steam is demanded.

Patent Literature 1; JP 2011-80725 A

Non Patent Literature 1; Dropwise Condensation—The Way to Practical Applications (Ichiro Tanasawa, Seisan-Kenkyu (Monthly journal of the Institute of Industrial Science, University of Tokyo), June, 1978, p. 209-220)

SUMMARY OF INVENTION

An object of the present invention is to provide a method for condensing steam efficiently by materializing dropwise condensation in a method for liquefying and condensing steam by introducing the steam to a heat exchanger and contacting the steam with a cooling body in the heat exchanger.

The present inventors have found that by adding a dropwise condensation promoter such as a film-forming amine to steam to be introduced to a heat exchanger or directly to the heat exchanger, the dropwise condensation promoting effect can sufficiently be exhibited and the condensing effect can be enhanced by dropwise condensation.

The present invention has the following gist.

[1] A method for condensing steam that is a method for liquefy and condense steam by introducing the steam to a heat exchanger and contacting the steam with a cooling body in the heat exchanger, the method comprising adding a dropwise condensation promoter to the steam to be introduced to the heat exchanger or directly to the heat exchanger.

[2] The method for condensing steam according to [1], wherein the dropwise condensation promoter is one or two or more selected from the group consisting of a volatile amine compound and a volatile non-amine compound.

[3] The method for condensing steam according to [1] or [2], wherein an emulsifier and/or a neutralizing amine is further added to the steam.

[4] The method for condensing steam according to any one of [1] to [3], wherein a material of the cooling body is a mild steel, a low alloy steel, an alloy steel, copper, a copper alloy, titanium, a titanium alloy, aluminum or an aluminum alloy.

[5] The method for condensing steam according to any one of [1] to [4], wherein no apparatus involving a temperature rise and/or a pressure rise is provided between a chemical injection point where the dropwise condensation promoter is added to the steam and the heat exchanger.

[6] The method for condensing steam according to any one of [1] to [5], wherein the heat exchanger is a steam turbine, a steam condenser, an air cooled steam condenser, a drying device, a concentrating device or a temperature-raising device.

Advantageous Effects of Invention

According to the present invention, in a method for liquefying and condensing steam by introducing the steam to a heat exchanger and contacting the steam with a cooling body in the heat exchanger, dropwise condensation is materialized, so that the steam can efficiently be condensed.

According to the present invention, by enhancement of the condensation efficiency by materializing the dropwise condensation, the reduction of the amount of steam used, the improvement of the process efficiency and the reduction of the cooling surface area of heat exchangers can be achieved, and the cutback of the initial cost due to the downsizing of facilities, the cutback of the amount of steam due to the improvement of the efficiency of existing facilities and the enhancement of the productivity can be achieved.

In particular, in power-generating plants, the improvement of the degree of vacuum and the enhancement of the power-generating efficiency are achieved due to the enhancement of the heat transfer efficiency of steam condensers, thereby enabling the energy saving.

DESCRIPTION OF EMBODIMENTS

Figure 1:
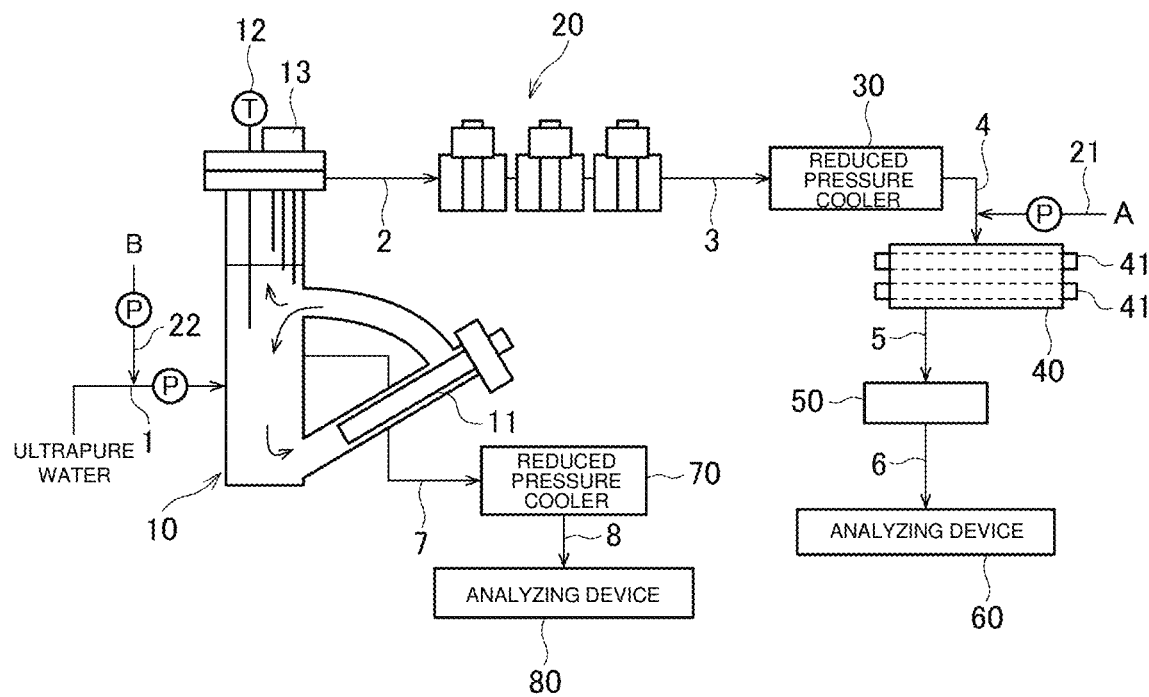
FIG. 1 is a system diagram illustrating a test apparatus used in Examples and Comparative Examples.

Hereinafter, embodiments of the present invention will be described in detail.

The method for condensing steam according to the present invention comprises adding a dropwise condensation promoter to steam to be introduced to a heat exchanger or directly to the heat exchanger in a method for liquefying and condensing steam by introducing the steam to the heat exchanger and contacting the steam with a cooling body in the heat exchanger.

Although addition of a film-forming amine as a corrosion inhibitor to feed-water for a boiler is conventionally carried out, the film-forming amine added to the feed-water for a boiler is partially contained in boiler blow water and discharged out of the system, and does not reach up to a heat exchanger on the later stage of the boiler, making almost no contribution to promotion of dropwise condensation in the heat exchanger. Also the film-forming amine contained in steam from the boiler and then discharged from the boiler is consumed in piping and apparatuses until reaching the heat exchanger. The film-forming amine in the steam, when a high-temperature facility such as a superheating device or a high-pressure facility is installed between the boiler and the heat exchanger, ends in being decomposed in these facilities; so, the film-forming amine in an amount such that a water-repellent film can be formed on the cooling body surface of the heat exchanger cannot reach up to the heat exchanger, or in order for a water-repellent film to be formed in the heat exchanger, a long time is needed.

Hence, as seen in conventional methods, even when a film-forming amine is added to feed-water for a boiler, it is difficult to achieve promotion of dropwise condensation in a heat exchanger.

In the present invention, by adding a dropwise condensation promoter such as a film-forming amine is added to steam to be introduced to a heat exchanger or directly to the heat exchanger, the dropwise condensation promoter can be made to function effectively for formation of a water-repellent film on a cooling body surface of the heat exchanger, and the dropwise condensation promoting effect corresponding to the amount thereof added can be attained stably and promptly.

In order "to add the dropwise condensation promoter to steam to be introduced to a heat exchanger", a chemical injection point of the dropwise condensation promoter may be installed on the inlet side of the heat exchanger. Specifically, it is preferable that the dropwise condensation promoter is added to a chemical injection point where no apparatuses involving temperature rise and/or pressure rise are present between the chemical injection point and the heat exchanger.

A method for the addition includes, for example, in the case of an apparatus having a multi-pressure steam turbine, a method for adding a dropwise condensation promoter to a point short of a low pressure turbine where steam becomes wet steam (steam from overhead piping from an intermediate pressure turbine or a low pressure boiler).

In order "to add a dropwise condensation promoter directly to a heat exchanger", a method for the addition includes, for example, a method for injecting an aqueous solution of the dropwise condensation promoter to the heat exchanger. When the heat exchanger is a steam condenser and makeup water is supplied to the steam condenser, the method alternatively includes a method for adding the dropwise condensation promoter to the makeup water and adding the dropwise condensation promoter-containing makeup water to the steam condenser being a heat exchanger.

In any case, it is preferable that piping and apparatuses whose temperature is a temperature at which the dropwise condensation promoter easily thermally decompose, for example, a temperature of 350° C. or higher, are not present in the route from the chemical injection point of the dropwise condensation promoter to the heat exchanger.

The material of a cooling body of a heat exchanger to which the present invention is applied is not especially limited, and may be a material such that dropwise condensation can be materialized due to the formation of a water-repellent film by a dropwise condensation promoter to be used. The material includes, for example, a mild steel, a low alloy steel, an alloy steel, copper, a copper alloy (brass, cupronickel or the like), titanium, a titanium alloy, aluminum or an aluminum alloy.

Also the type and kind of the heat exchanger is not especially limited, and examples of a heat exchanger to which the present invention is applied include a steam turbine, a low pressure turbine and the like (steam turbine after an intermediate pressure turbine), a steam condenser, an air cooled steam condenser, a drying device, a concentrating device and a temperature-raising device.

The dropwise condensation promoter to be used in the present invention suffices if being one having volatility and interfacial activity and serving the dropwise condensation promoting effect, and includes volatile amine compounds (film-forming amines) and volatile non-amine compounds which are conventionally used as corrosion inhibitors.

Specific examples of the volatile amine compounds include, as monoamine, long-chain saturated aliphatic amines such as dodecylamine, tridecylamine, tetradecylamine, pentadecylamine, hexadecylamine, heptadecylamine, octadecylamine, nonadecylamine, eicosylamine and docosylamine, long-chain unsaturated aliphatic amines such as oleylamine, ricinoleylamine, linoleylamine and linolenylamine, mixed amines such as coconut oil amine and hardened beef tallow amine, and mixtures thereof.

The volatile amine compounds also include, as preferable ones, polyamines represented by the following general formula (1).

$$R^1-[NH-(CH_2)_m]_n-NH_2 \qquad (1)$$

wherein $R^1$ denotes a saturated or unsaturated hydrocarbon group having 10 to 22 carbon atoms; and m is an integer of 1 to 8, n is an integer of 1 to 7, and when n is 2 or more, a plurality of $NH-(CH_2)_m$ may be identical or different.

The saturated or unsaturated hydrocarbon group of $R^1$ may be of a straight-chain or a branched-chain, or cyclic. $R^1$ includes an alkyl group, an alkenyl group, an alkadienyl group and an alkynyl group, and is preferably a straight-chain alkyl group or a straight-chain alkenyl group. The number of carbon atoms of $R^1$ is preferably 15 to 22.

m is an integer of 1 to 8, and from the viewpoint of corrosion suppression, preferably an integer of 2 to 6. The $(CH_2)_m$ group includes a methylene group, an ethylene group (dimethylene group), a propylene group (trimethylene group) and a butylene group (tetramethylene group), and is preferably a propylene group.

n is preferably an integer of 1 to 3 from the viewpoint of corrosion suppression.

Specific examples of such polyamines include dodecylaminomethyleneamine, dodecylaminodimethyleneamine, dodecylaminotrimethyleneamine (N-stearyl-1,3-propanediamine) and tetradecyl, hexadecyl, and octadecyl compounds corresponding to these polyamines, and octadecenylaminotrimethyleneamine, octadecenylaminodi-(trimethylamino)-trimethyleneamine, palmitylaminotrimethyleneamine and tallow alkyldiamine ethoxylates; and N-oleyl-1,3-propanediamine (that is, N-octadecenylpropane-3-diamine), which is easily available in a sufficient purity, is preferable.

Also a trade name: "Ethiduomine", (a mixture of tris(2-hydroxyethyl)-N-tallowalkyl-1,3-diaminopropane and di(2-hydroxyethyl)-N-tallowalkyl amine in 7:3), manufactured by Akzo Nobel N.V., can suitably be used.

The volatile non-amine compounds include polyethylene (20) sorbitan monostearate, sorbitan monostearate and sorbitan monolaurate.

These dropwise condensation promoters may be used singly or as a mixture of two or more.

The amount of a dropwise condensation promoter to be added may be an amount such that the dropwise condensation promoting effect in a heat exchanger can be attained, and depends on the kind of the dropwise condensation promoter, the type of the heat exchanger and the like. The amount of the dropwise condensation promoter to be added is, based on the amount of steam in terms of water, preferably 0.001 to 10 mg/L, especially 0.01 to 2.0 mg/L.

Although the addition of the dropwise condensation promoter may be intermittent addition or continuous addition, from the viewpoint of stably maintaining a water-repellent film by condensation thereof on the cooling body surface of a heat exchanger, making the addition to be continuous addition is preferable.

The dropwise condensation promoter may be dissolved in water or a solvent such as methanol, ethanol or isopropanol, and added to steam or feed-water. The dropwise condensation promoter may be made into an aqueous emulsion by using an emulsifier, and added to steam or feed-water. The emulsifier is preferably one having a high HLB (hydrophilic-lipophilic balance) value. The HLB of the emulsifier is preferably 12 to 16 and more desirably 13 to 15.

Examples of the emulsifier include polyoxyethylenealkylamine, and preferable is a polyoxyethylenealkylamine whose alkyl group has 10 to 18 carbon atoms.

As emulsifiers other than these, fatty acid alkali metal salts, particularly saturated or unsaturated fatty acid alkali metal salts having 8 to 24, particularly 10 to 22, carbon atoms can suitably be used, and specifically include sodium or potassium salts of saturated or unsaturated fatty acids such as capric acid, lauric acid, myristic acid, palmitic acid, stearic acid, arachic acid, behenic acid, oleic acid, erucic acid, linoleic acid and linolenic acid. As the fatty acid alkali metal salts, sodium salts or potassium salts of fatty acids produced from edible fat and oil can also be preferably used. As the fatty acid alkali metal salts, alkali metal salts of fatty acids containing 25% by weight or higher of at least one selected from the group consisting of, particularly, unsaturated fatty acids having 14 to 22 carbon atoms, for example, oleic acid, erucic acid, linoleic acid and linolenic acid, are suitable. As the emulsifier, besides, esters of glycerol with the above-mentioned fatty acids can also be preferably used. Esters with stearic acid can be used especially preferably.

The emulsifiers may be used singly or concurrently in two or more.

When the dropwise condensation promoter is made into an aqueous emulsion by using an emulsifier such as a fatty acid alkali metal salt, it is suitable that the blend proportion of the dropwise condensation promoter to the emulsifier is, in weight ratio (dropwise condensation promoter/emulsifier), 40/1 to 1/1, especially about 20/1 to 2/1.

In the present invention, together with the above-mentioned dropwise condensation promoter, other chemical agents may be concurrently used. For example, a neutralizing amine having a pH-adjusting function may be concurrently used. The concurrent use of the neutralizing amine enables attaining the effect of reducing the corrosiveness in the system.

As the neutralizing amine, volatile amines, such as ammonia, monoethanolamine (MEA), cyclohexylamine (CHA), morpholine (MOR), diethylethanolamine (DEEA), monoisopropanolamine (MIPA), 3-methoxypropylamine (MOPA), 2-amino-2-methyl-1-propanol (AMP) and diglycolamine (DGA), and the like can be used. The neutralizing amines may be used singly or concurrently in two or more.

In place of the neutralizing amine, pH adjustment may be carried out by ammonia originated from thermal decomposition of the following deoxidizing agent.

In the case of the concurrent use of the neutralizing amine, it is preferable that the amount of the neutralizing amine to be added, though depending on the amount of the dropwise condensation promoter to be used and the type of the heat exchanger, is made to be 0.1 to 50 mg/L, especially 1 to 30 mg/L, based on the amount of steam in terms of water.

A deoxidizing agent may be used concurrently together with the dropwise condensation promoter. The concurrent use of the deoxidizing agent enables, similarly to the neutralizing amine, attaining the effect of reducing corrosion in the system.

As the deoxidizing agent, hydrazine derivatives such as hydrazine and carbohydrazide can be used. As non-hydrazine-based deoxidizing agents, carbohydrazide, hydroquinone, 1-aminopyrrolidine, 1-amino-4-methylpiperazine, N,N-diethylhydroxylamine, isopropylhydroxylamine, erythorbic acid or salts thereof, ascorbic acid or salts thereof, tannic acid or salts thereof, saccharides and sodium sulfite can also be used. These may be used singly or concurrently in two or more.

In the case of the concurrent use of the deoxidizing agent, it is preferable that the amount of the deoxidizing agent to be added, though depending on the amount of the dropwise condensation promoter used, the type of the heat exchanger and the like, is made to be 0.01 to 3 mg/L, especially 0.05 to 1 mg/L, based on the amount of steam in terms of water.

The above-mentioned chemical agents to be concurrently used may be added to the same place as for the dropwise condensation promoter, or may be added to different places. In the case of adding two or more chemical agents to the same place, the chemical agents to be added may be previously mixed and then added, or may be added separately.

EXAMPLES

Hereinafter, the present invention will be described more specifically by way of Examples.
[Test Apparatus]

In the following Examples and Comparative Examples, by using a test apparatus illustrated in FIG. 1, experiments in which chemical injection points had an influence on the condensation efficiency were carried out.

The test apparatus was an apparatus in which steam generated in a 6.8 L-volume SUS316L-made test boiler 10 was passed through piping 2, further heated in a superheating device 20, thereafter fed through piping 3 to a reduced pressure cooler 30 where the resultant steam was reduced in pressure and cooled, and thereafter fed through piping 4 to a heat exchanger (surface condenser) 40 to be condensed in the heat exchanger 40; and the condensed water was fed through piping 5 to a cooler 50 to be cooled, and thereafter fed through piping 6 to an analyzing device 60 to be analyzed.

The superheating device 20 was constituted, in order to stably adjusting the superheating temperature, by arranging a superheater, a desuperheater and a superheater in series.

Ultrapure water for generating steam was supplied through piping 1 to the test boiler 10. The boiler 10 had a heating tube 11 incorporated thereto; and a circulating water flow was formed in the boiler 10, and water in the boiler 10 was heated to thereby generate steam. The generated steam was fed through the piping 2 to the superheating device 20.

A thermosensor 12 and a water level sensor 13 were installed in the test boiler 10.

Blow water of the boiler 10 was fed through piping 7 to a reduced pressure cooler 70 where the blow water was reduced in pressure and cooled, and thereafter fed through piping 8 to an analyzing device 80 to be analyzed.

In the heat exchanger 40, cooling water was circulated in SUS304-made cooling tubes 41, and steam was cooled and condensed on the outer surface of the tubes. The piping 4 through which the steam from the reduced pressure cooler 30 was fed to the heat exchanger 40, and the piping 1 through which the ultrapure water was fed to the test boiler 10 were provided with chemical injection points A, B, respectively, and were constituted so that a chemical agent could be injected therethrough from chemical injection piping 21, 22, respectively.

In any tests, sodium phosphate ($Na_3PO_4$) of 2.0 mg/L in terms of phosphate concentration (in terms of $PO_4$) in boiler water as a boiler compound was added.

After carrying out each test, the inside of the devices and the piping was circulated or wiped with a washing liquid containing diethylene glycol, and a next test was started under the condition that no promoter was left on the metal surface.

Example 1, Comparative Example 1

Ultrapure water sufficiently deaerated by using nitrogen (temperature: 65° C., dissolved oxygen concentration: 2 to 10 μg/L) was fed to the test boiler 10 of the test apparatus, and steam was generated by operation under the condition indicated in Table 1. The heaters of the superheating device were not used and the test was carried out using saturated steam.

N-oleyl-1,3-diaminopropane was used as the promoter, and continuously added to the steam or the feed-water so that the concentration thereof became 1,000 mg/L in terms of concentration of a 0.1 wt % aqueous solution thereof to be added. In the case of the addition to the steam, the promoter was continuously added so that the concentration thereof became 1,000 mg/L in terms of concentration of the solution to be added to water in an amount corresponding to the amount of the steam. The promoter solution was added all the time under stirring by a stirrer so as not to cause separation thereof.

In Example 1, the promoter solution was added through the chemical injection point A to the steam to be introduced to the heat exchanger 40.

In Comparative Example 1, the promoter solution was added through the chemical injection point B to the ultrapure water to be introduced to the test boiler 10.

TABLE 1

| | |
|---|---|
| Pressure (MPa) | 2.0 |
| Superheated steam temperature | no superheating |
| Amount evaporated (L/h) | 7.4 |
| (min to max) | (7.3~7.5) |
| Amount blown (L/h) | 0.82 |
| (min to max) | (0.81~0.83) |
| Blow rate (%) | 10.0 |
| Pressure and temperature after cooling and pressure reduction | no cooling nor pressure reduction |

At 2 hours, 48 hours and 96 hours after the start of the test, blow water from the test boiler 10 and steam condensed water from the cooler 50 were sampled, respectively, and the concentrations of the promoter were determined by the measuring method utilizing Rose Bengal by the analyzing devices 80, 60, and the detection rates were calculated according to the following expression. Results are shown in Table 2.

Detection rate (%)=an actually detected concentration (mg/L)/a theoretical detection concentration (mg/L)×100

(The theoretical detection concentration was 0.1%×1,000 mg/L=1 mg/L as the promoter)

TABLE 2

| | Detection rate (%) | | | | | |
|---|---|---|---|---|---|---|
| | Example 1 | | | Comparative Example 1 | | |
| Elapsed time | 2 h | 48 h | 96 h | 2 h | 48 h | 96 h |
| Test boiler blow water | N.D. | N.D. | N.D. | 0.8 | 10 | 10 |
| Steam condensed water | 35 | 85 | 90 | 10 | 30 | 60 |

As is clear from Table 2, in Comparative Example 1, in which the promoter was added to the feed-water of the test boiler 10, the promoter was partially contained in the blow water and discharged out of the system. By contrast, in Example 1, in which the promoter was added to the steam to be introduced to the heat exchanger 40, such a problem did not arise.

It is clear that in Comparative Example 1, in which the promoter was added to the feed-water of the test boiler 10, the concentration of the promoter in the condensed water was lower than that in Example 1 due to adsorption and consumption thereof until the promoter reached the heat exchanger 40, and the formation of dropwise condensation was not carried out sufficiently.

Example 2, Comparative Example 2

Tests were carried out as in Example 1 (the promoter was added through the chemical injection point A) and Comparative Example 1 (the promoter was added through the chemical injection point B), except for using the superheating device and carrying out the operation under the condition indicated in Table 3.

TABLE 3

| | |
|---|---|
| Pressure (MPa) | 10.0 |
| Superheated steam temperature (° C.) | 530 |

TABLE 3-continued

| | |
|---|---|
| Amount evaporated (L/h) | 7.0 |
| (min to max) | (6.9~7.1) |
| Amount of water blown (L/h) | 0.07 |
| (min to max) | (0.065~0.075) |
| Blow rate (%) | 1.0 |
| Pressure and temperature after cooling and pressure reduction | about 2.0 MPa, 250° C. |

As in Example 1 and Comparative Example 1, at 2 hours, 48 hours and 96 hours after the start of the test, blow water from the test boiler 10 and steam condensed water from the cooler 50 were sampled, respectively, and the concentrations of the promoter were determined by the measuring method utilizing Rose Bengal by the analyzing devices 80, 60. Calculation results of the detection rates are shown in Table 4.

After the tests, the cooling tubes 41 were taken out from the heat exchanger 40; while cooling water at 20° C. (temperature of the tube inlet) was passed through in the cooling tubes 41 at 24 mL/min, saturated steam (at the ambient pressure) was supplied onto the range of about 7 cm in length from the lower part of the tubes; and the condensation state at this time was observed and the temperature of the cooling water at the tube outlets was measured.

Figure 2A:
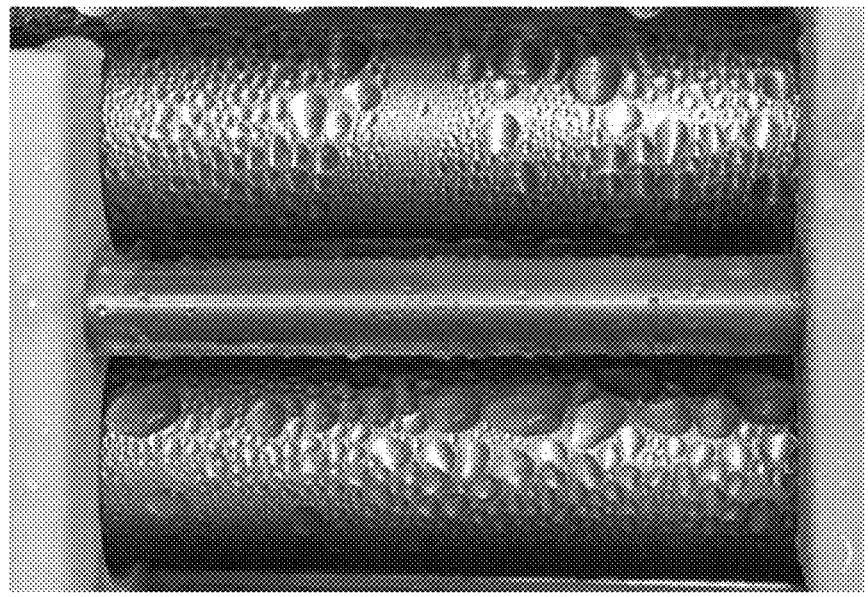
FIG. 2a is an appearance photograph of cooling tubes in a condensation-state confirmation test of Example 2.
Figure 2B:
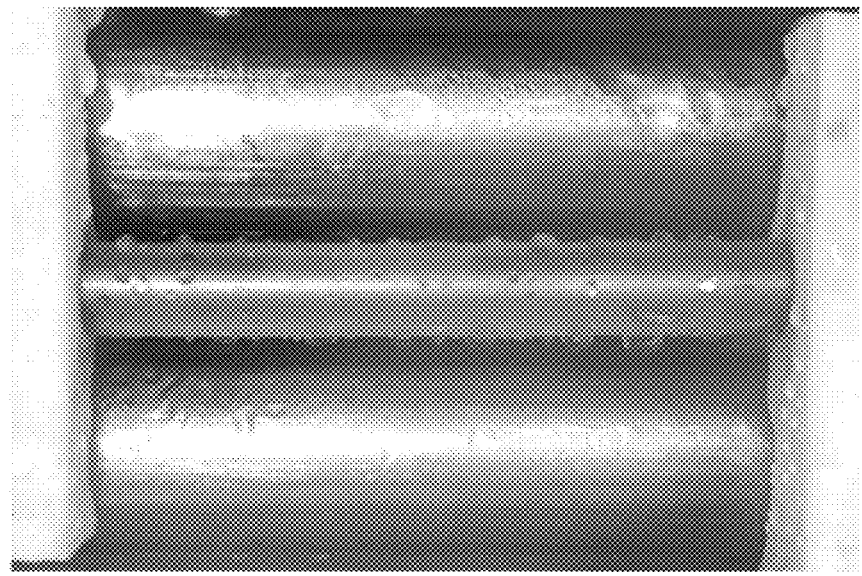
FIG. 2b is an appearance photograph of cooling tubes in a condensation-state confirmation test of Comparative Example 2.

Appearance photographs of the tubes in the respective Examples are shown in FIG. 2a (Example 2) and FIG. 2b (Comparative Example 2).

The differences between the tube outlet temperatures and the tube inlet temperatures of the cooling water are shown in Table 5.

TABLE 4

| | Detection rate (%) | | | | | |
|---|---|---|---|---|---|---|
| | Example 2 | | | Comparative Example 2 | | |
| Elapsed time | 2 h | 48 h | 96 h | 2 h | 48 h | 96 h |
| Test boiler blow water | N.D. | N.D. | N.D. | 0.5 | 1.0 | 1.5 |
| Steam condensed water | 40 | 80 | 90 | N.D. | 0.5 | 1.0 |

TABLE 5

| | Example 2 | Comparative Example 2 |
|---|---|---|
| Cooling water outlet temperature (° C.) | 31 | 24 |
| Difference between cooling water outlet temperature and inlet temperature (° C.) | 11 | 4 |

As is clear from Table 4, in Comparative Example 2, in which the promoter was added to the feed-water of the test boiler 10, the promoter was partially contained in the blow water and discharged out of the system, and was decomposed under the high-temperature high-pressure condition until the promoter reached the heat exchanger 40. Further, the concentration of the promoter in the heat exchanger 40 became considerably lower than that in Example 2 due to adsorption thereof to and consumption thereof in the apparatus. In Comparative Example 2, since the superheating device 20 was operated, the decomposition of the promoter more progressed than in Comparative Example 1, and the promoter concentration in the steam condensed water was remarkably low. Under such a low concentration condition of the promoter, it was impossible for a film for dropwise condensation to be formed on the cooling tube surface.

In Example 2, a sufficient amount of the promoter was contained in the steam condensed water and a film of the promoter for dropwise condensation could be formed on the cooling tube surface.

Consequently, as is also clear from FIG. 2a and FIG. 2b, in Example 2, the cooling tube surface had water repellency as compared with in Comparative Example 2 and was in the state of dropwise condensation.

The tube outlet temperature of the cooling water was also higher in Example 2 than in Comparative Example 2, and whereas the difference between the outlet temperature and the inlet temperature of the cooling water was 4° C. in Comparative Example 2, the difference was 11° C. in Example 2, wherein a rise of about 250% was recognized; thus, it is clear that materialization of dropwise condensation could largely enhance the condensation efficiency.

The present invention has been described by using specific embodiments, but it is obvious to those skilled in the art that various changes and modifications may be made without departing from the aim and the scope of the present invention.

The present application was based on Japanese Patent Application No. 2018-046833, filed on Mar. 14, 2018, the entire disclosure of which is hereby incorporated by reference.

REFERENCE SIGNS LIST

10 TEST BOILER
20 SUPERHEATING DEVICE
30, 70 REDUCED PRESSURE COOLER
40 HEAT EXCHANGER
50 COOLER
60, 80 ANALYZING DEVICE

The invention claimed is:

1. A method for condensing steam that is a method for liquefying and condensing steam by introducing the steam to a heat exchanger and contacting the steam with a cooling body in the heat exchanger,
the method comprising adding a dropwise condensation promoter to the steam to be introduced to the heat exchanger or directly to the heat exchanger,
wherein the dropwise condensation promoter is one or two or more selected from the group consisting of a volatile amine compound and a volatile non-amine compound, the volatile non-amine compound being selected from the group consisting of polyethylene(20) sorbitan monostearate, sorbitan monostearate and sorbitan monolaurate.

2. The method for condensing steam according to claim 1, wherein an emulsifier and/or a neutralizing amine is further added to the steam.

3. The method for condensing steam according to claim 1, wherein a material of the cooling body is a mild steel, a low alloy steel, an alloy steel, copper, a copper alloy, titanium, a titanium alloy, aluminum or an aluminum alloy.

4. The method for condensing steam according to claim 1, wherein no apparatus involving a temperature rise and/or a pressure rise is provided between a chemical injection point where the dropwise condensation promoter is added to the steam and the heat exchanger.

5. The method for condensing steam according to claim 1, wherein the heat exchanger is a steam turbine, a steam condenser, an air cooled steam condenser, a drying device, a concentrating device or a temperature-raising device.

6. The method for condensing steam according to claim 1, wherein the dropwise condensation promoter is add in an amount of 0.001 to 10 mg/L based on an amount of steam in terms of water.

7. The method for condensing steam according to claim 1, wherein a neutralizing amine having a pH-adjusting function is further added to the steam in an amount of 0.1 to 50 mg/L based on an amount of steam in terms of water.

\* \* \* \* \*